United States Patent
Rytkönen et al.

(10) Patent No.: US 9,651,574 B2
(45) Date of Patent: May 16, 2017

(54) ACCELERATION SENSOR STRUCTURE AND USE THEREOF

(71) Applicant: MURATA ELECTRONICS OY, Vantaa (FI)

(72) Inventors: Ville-Pekka Rytkönen, Klaukkala (FI); Leif Roschier, Vantaa (FI); Anssi Blomqvist, Helsinki (FI)

(73) Assignee: MURATA ELECTRONICS OY, Vantaa (FI)

( * ) Notice: Subject to any disclaimer, the term of this patent is extended or adjusted under 35 U.S.C. 154(b) by 0 days.

(21) Appl. No.: 14/920,566

(22) Filed: Oct. 22, 2015

(65) Prior Publication Data
US 2016/0041194 A1 Feb. 11, 2016

Related U.S. Application Data

(62) Division of application No. 13/739,513, filed on Jan. 11, 2013, now Pat. No. 9,279,825.

(30) Foreign Application Priority Data

Jan. 12, 2012 (FI) ...................................... 20125034

(51) Int. Cl.
*G01P 15/00* (2006.01)
*G01P 15/125* (2006.01)
(Continued)

(52) U.S. Cl.
CPC .............. *G01P 15/125* (2013.01); *G01P 1/00* (2013.01); *G01P 15/00* (2013.01); *G01P 15/02* (2013.01); *G01P 15/18* (2013.01)

(58) Field of Classification Search
CPC .......... G01P 15/02; G01P 15/18; G01P 15/00; G01P 1/00
(Continued)

(56) References Cited

U.S. PATENT DOCUMENTS 4,174,891 A * 11/1979 Flint .................. G06K 17/0019
235/462.16
4,914,598 A * 4/1990 Krogmann ............. G01C 21/16
244/177

(Continued)

FOREIGN PATENT DOCUMENTS

CN 1804636 A 7/2006
CN 201852851 U 6/2011
(Continued)

OTHER PUBLICATIONS

European Search Report dated Jun. 5, 2015, for corresponding European Appln. No. 13736312.3.
(Continued)

*Primary Examiner* — Max Noori
(74) *Attorney, Agent, or Firm* — Squire Patton Boggs (US) LLP

(57) ABSTRACT

A MEMS-sensor structure comprising first means and second means coupled for double differential detection and positioned symmetrically to provide quantities for the double differential detection in a phase shift. If the sensor deforms, due to a specifically symmetric positioning of the first and second means, the effect of the displacement is at least partly eliminated.

7 Claims, 14 Drawing Sheets

(51) Int. Cl.
*G01P 15/02* (2013.01)
*G01P 15/18* (2013.01)
*G01P 1/00* (2006.01)

(58) Field of Classification Search
USPC .............................. 73/488, 862.041–862.046
See application file for complete search history.

(56) References Cited

U.S. PATENT DOCUMENTS

| | | |
|---|---|---|
| 6,257,059 B1 | 7/2001 | Weinberg et al. |
| 7,426,863 B2 | 9/2008 | Kuisma |
| 7,591,201 B1 | 9/2009 | Bernstein et al. |
| 8,539,836 B2 | 9/2013 | McNeil |
| 2004/0231420 A1 | 11/2004 | Xie et al. |
| 2005/0126287 A1 | 6/2005 | Malametz |
| 2006/0021436 A1 | 2/2006 | Kapser et al. |
| 2006/0185433 A1 | 8/2006 | Leonardson et al. |
| 2006/0272411 A1 | 12/2006 | Acar et al. |
| 2009/0145225 A1 | 6/2009 | Nasiri et al. |
| 2009/0223277 A1 | 9/2009 | Rudolf et al. |
| 2009/0260437 A1 | 10/2009 | Blomqvist |
| 2010/0107763 A1 | 5/2010 | Lin et al. |
| 2010/0147073 A1 | 6/2010 | Johnson et al. |
| 2010/0218605 A1 | 9/2010 | Blomqvist et al. |
| 2010/0257933 A1* | 10/2010 | Verjus ................ G01C 19/5755 73/504.04 |
| 2011/0023606 A1 | 2/2011 | Burghardt et al. |
| 2011/0030472 A1 | 2/2011 | Aziz et al. |
| 2011/0203373 A1 | 8/2011 | Konno |
| 2015/0201583 A1* | 7/2015 | Greeson ............... A01K 13/003 119/651 |
| 2016/0169927 A1* | 6/2016 | Lin .......................... G01P 1/00 73/488 |

FOREIGN PATENT DOCUMENTS

| | | |
|---|---|---|
| EP | 2 506 018 A2 | 10/2012 |
| JP | 2010-038903 A | 2/2010 |
| JP | 2010-238921 A | 10/2010 |
| JP | 2011-247812 A | 12/2011 |
| WO | 2010/107436 A1 | 9/2010 |
| WO | 2011/064642 A2 | 6/2011 |

OTHER PUBLICATIONS

Xie et al., Vertical comb-finger capacitive and actuation and sensing for CMOS-MEMS, (2002), Sensors and actuators (95), p. 212-221.
US International Search Report for US PCT/FI2013/050024, dated May 6, 2013.
US International Search Report for US PCT/FI2013/050025, dated May 14, 2013.
Finnish Search Report dated Sep. 7, 2012, corresponding to Finnish Patent Application No. 20125034.
European Patent Office, European Search Report for corresponding European patent application No. EP 16 16 4019, May 9, 2016.
Chinese Search Report for Corresponding Patent Application No. 2013800141395, Oct. 25, 2015.

* cited by examiner

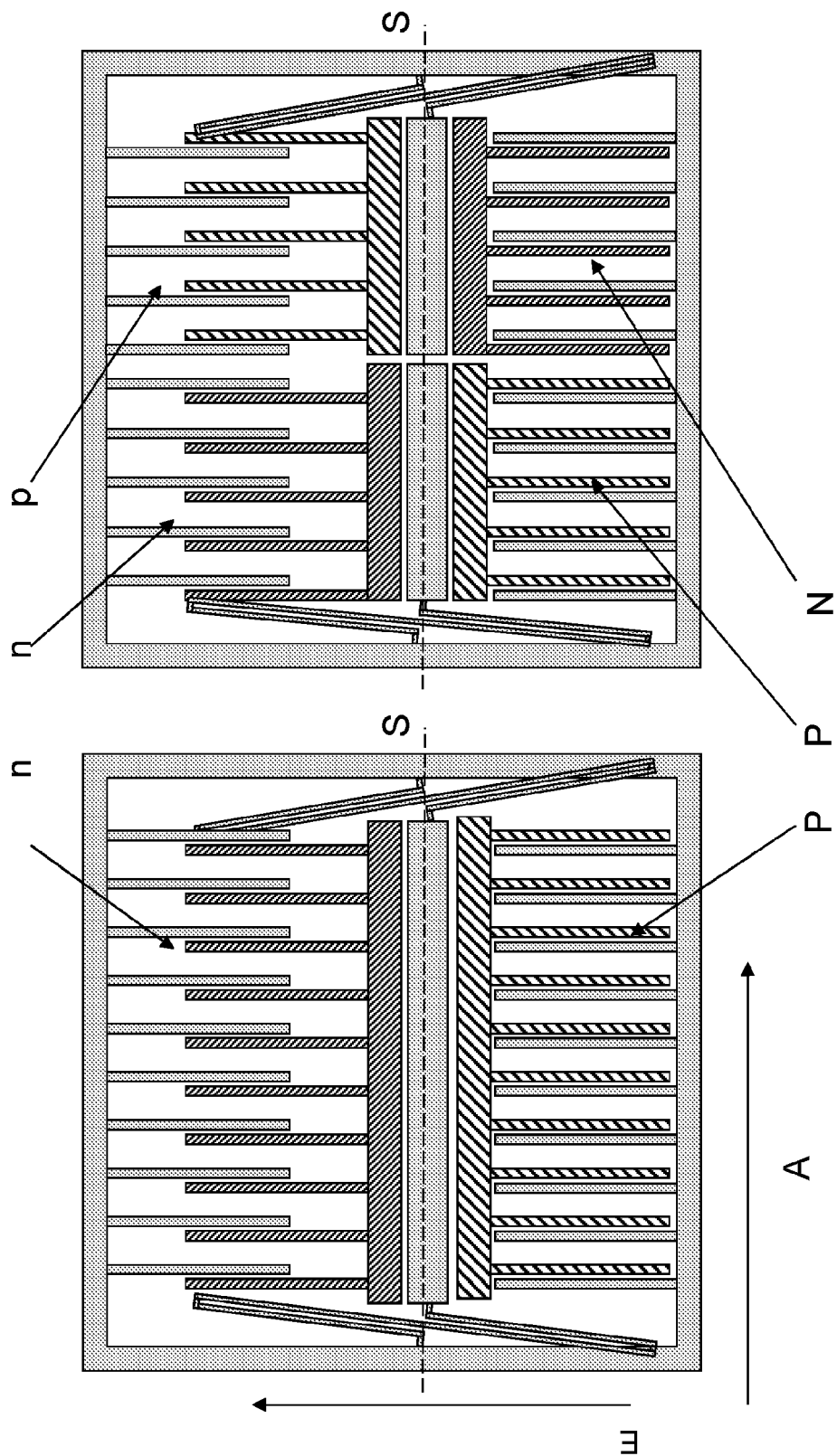

X,Y

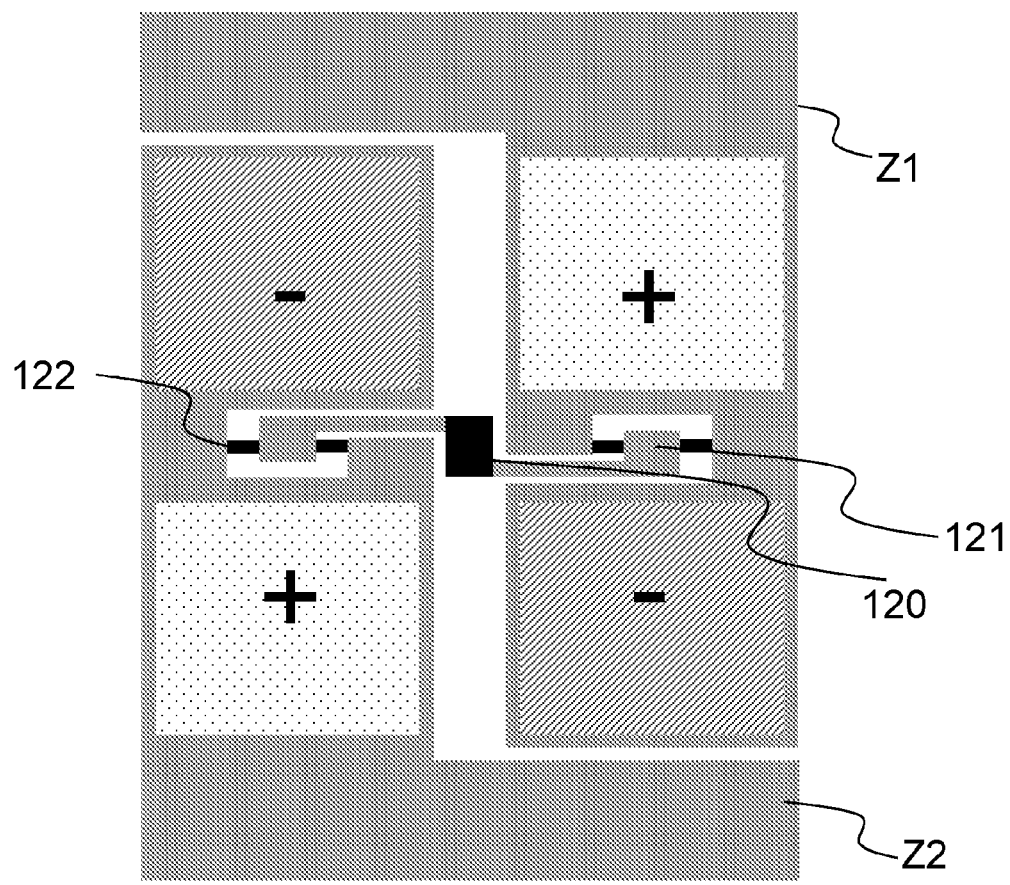
Figure 12
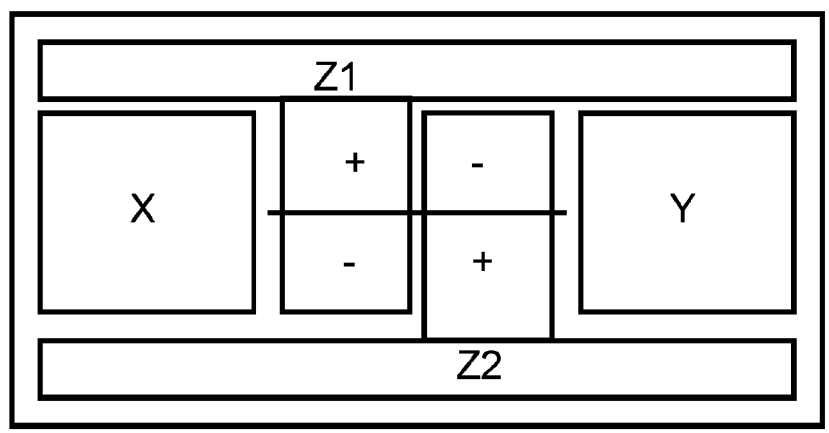
Figure 15
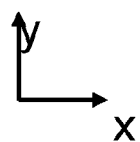

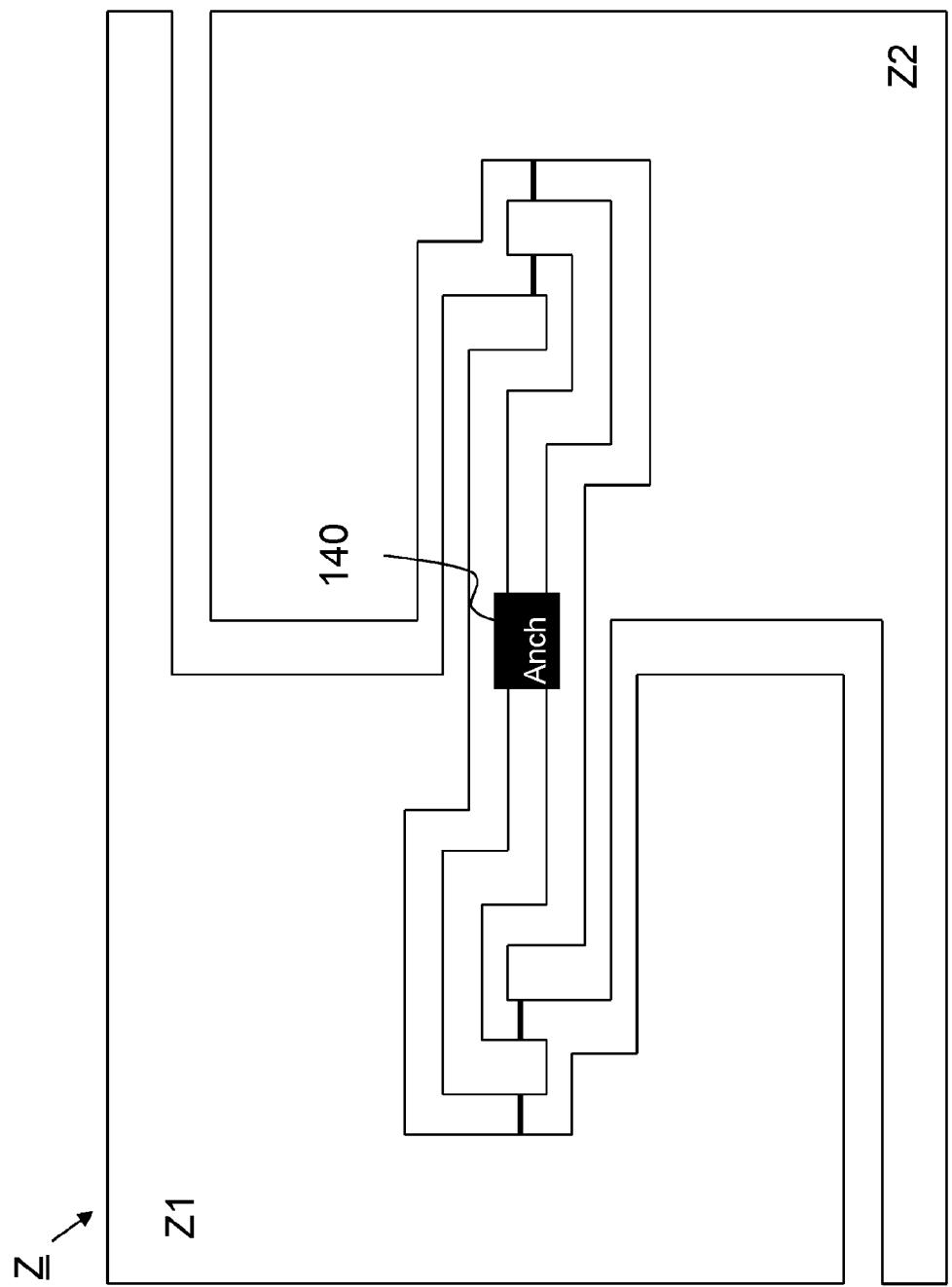

ACCELERATION SENSOR STRUCTURE AND USE THEREOF

This application is a Divisional of co-pending application Ser. No. 13/739,513 filed on Jan. 11, 2013, which claims priority to Application No. 20125034 filed in Finland, on Jan. 12, 2012. The entire contents of all of the above applications are hereby incorporated by reference.

The invention relates to MEMS, micro-electro-mechanical systems in general, but more specifically to an accelerator sensor structure as indicated in the preamble of an independent claim directed to a MEMS sensor structure. The invention relates also to a sensor structure matrix, a sensor device, and a system as indicated in the preambles of the respective independent claims.

Sensing acceleration of a body to provide a signal that depends on the kinetic state of said body under the influence of acting forces is a widely applied way to determine the position and/or location of the body. For the purpose, various sensors can be used, but MEMS structures are suitable for many applications because of their small size. In microelectronics, the increasing demand has made it possible to develop better and better structures for purposes encountered in many fields, for example such that relate to vehicles, domestic electronics, clothes, shoes, just to mention a few applied fields in which patent classes may comprise MEMS related acceleration sensors.

However, at the priority date of the present patent application, the known MEMS structures encounter some problems that restrict their use in the industry. Alternatively, the related products using the acceleration sensor can be made sufficient to their desired purpose, but the use of prior art MEMS structures may necessitate extra signal processing, error correction and/or compensation means and solutions to achieve a component that fulfills its purpose. The operation of a MEMS component can be improved by extraneous electro-mechanical means, but typically such means make the overall structure complicated and increase the manufacturing cost. They may also make the structure sensitive to malfunctioning, as the number of extraneous interacting parties increase.

In the following FIGS. 1 to 5B, some of drawbacks of the known techniques have been demonstrated.

FIG. 1 illustrates an exemplary sensor structure with a X- and/or Y-direction sensitive cell for acceleration sensing according to the known techniques, based on capacitive detection with comb-structure detection means. The cell comprises a movable frame 102 for an effective mass. The effective mass of the movable frame is arranged to hold an ensemble of movable electrodes 103. Only one such electrode is indicated with the label 103, but skilled man in the art knows that there can be more than one electrode in said ensemble of movable electrodes. A skilled man in the art also knows that if there are many movable electrodes in the ensemble, their contribution to the effective mass needs to be duly considered.

Elements through which the cell may be anchored to a surface of an object are indicated by number and character combinations 106, 107N, 107P. The appended letter "N" denotes to negative charge and/or voltage and the appended letter P denotes to positive charge and/or voltage. The bare number of 106 may be indicative of ground potential and/or having a bare mechanical character. Thus, stationary electrodes 105N and 104P denoted with the respective sign indications N and P in FIG. 1 may have the corresponding polarity as the interconnected anchors 107N, 107P. Anchor structures 106, 107N, 107P may be isolated from the ground, but the isolation arrangement, as such, is not relevant in this context. A skilled man in the field of MEMS structures knows many ways to isolate component parts in a MEMS structure, where such is necessary. The movable frame 102 is connected via springs 101 to the anchor structure 106.

The prior art structure of FIG. 1 is a differential structure, i.e. the N signed capacitance decreases when the P signed capacitance increases, when the frame 102 suspended with the springs 101 moves in the +X-direction, and vice versa. The illustration shows a symmetric structure in respect to the anchor 106, which is valid in the rest state of the moving frame 102.

The sensor structures of FIGS. 2 and 3 illustrate prior art z-direction sensitive acceleration sensor structures implemented by means of elements with positive and negative capacitance electrode areas. These positive and negative capacitance areas are indicated in the figures with corresponding polarity labels + and −, respectively.

FIG. 2 illustrates an exemplary mechanical element that comprises a proof mass 202, and a pivot axis 204. If the proof mass 202 is considered to extend in the x-y-direction (shown) and the proof mass 202 is under influence of acceleration in the z-direction, it experiences a force that causes it to pivot around its axis 204 accordingly.

The negative and positive capacitance electrode areas 206P, 206N on the moving proof mass 202 may be arranged to interact with static electrodes and generate a capacitance that varies according to the movement of the proof mass. For clarity reasons, the static electrodes of the formed capacitors are not shown in FIGS. 2 and 3. However, each electrode moving with the proof mass can have a dedicated static electrode, or a common static electrode may be provided for the positive and negative electrode areas. For example, electrode areas 206P, 206N may have a common static electrode that is in ground potential.

The prior art sensor structure of FIG. 3 may be implemented by means of a pivotable pair of mechanical elements Z1, Z2, each of which comprises a proof mass 301, 302 and a pivot axis Axi. Again, when the masses 301,302 are under influence of acceleration in the z-direction, they experience acceleration force that causes them to pivot around their respective axes Axi. The mechanical elements are arranged to move in a see-saw or "teeter-totter" type of way such that while pivoting, one side of the element moves to one direction and at the same time the other side of the element moves to an opposite direction. The capacitances of electrode areas 303P, 304P, 305N, 306N change accordingly, so that, for example, when the capacitance of electrode 303P increases, the capacitance of electrode 305N decreases correspondingly. Similarly, when the capacitance of electrode 304P increases, the capacitance of electrode 306N decreases correspondingly. The increasing and decreasing P- and N-elements may change, but the simultaneous opposite see-saw-movements occurs in both situations. In FIG. 3, the proof mass of both mechanical elements is distributed unevenly in respect of the pivot axis Axi. Upper and lower mechanical elements of FIG. 3 are shown to have a single symmetry. The pivoting can be arranged to be rotational around the Axi with a pair of torque-oriented springs. The pivot axis Axi can thus be implemented with a pair of springs with a torque action.

FIGS. 4A and 4B illustrate a problem detected with the sensor structure of FIG. 2. FIG. 5A shows a schematic photograph in a top view of 3d-acceleration sensor structure where one mechanical see-saw element of FIG. 2 is used. The sensor structure comprises also comb-structured capacitive detection cells of FIG. 1 for acceleration detection in X- and Y-directions. FIG. 4A illustrates the pivotable mechanical element Z in the middle of the sensor structure used in a detector. As discussed with FIG. 2, the mechanical element is divided by the axis Axi to a shorter part and a longer part. FIG. 4B illustrates a side view of the mechanical element Z of the sensor structure of FIG. 4A. FIG. 4B shows also a structure 400, for example a cover or a substrate, on which the ground electrodes 402, 404 for capacitances of Z are fixed. When the structure on which the mechanical element deforms, or the structure on which the ground electrodes are secured deforms, the distance of the ground electrodes to the electrode areas of the mechanical element Z change in different ways, as the schematic indicates. For example, in the case illustrated in FIG. 4B, the distance to the negative electrode decreases and the distance to the positive electrode increases, which means that conventional differential detection, is severely disturbed by the deformation.

FIGS. 5A and 5B illustrate a problem detected with the conventional sensor structure of FIG. 3. FIG. 5A shows a schematic photograph in a top view of a sensor structure, where the pair of mechanical see-saw elements of FIG. 3 are used. The sensor structure comprises also a comb-structured capacitive detection cell XY of FIG. 1 for acceleration detection in X- and Y-directions. FIG. 5B illustrates a side view of the mechanical elements Z1, Z2 of the sensor structure of FIG. 5A. FIG. 5B shows a further structure 500 on which the ground electrodes 502, 504 for capacitances of Z1, Z2 are fixed. It may be seen that when the structure on which the mechanical elements are supported deforms, or the structure on which the ground electrodes are secured deforms, the distances between the ground electrodes and the electrode areas of the mechanical elements Z1 and Z2 change in different ways, as the schematic indicates. For example, in the case illustrated in FIG. 5B, the distance from the negative capacitance electrode areas of Z1, Z2 to the ground electrodes increase, and the distances from the positive capacitance electrode areas of Z1, Z2 to the positive electrodes decreases. When differential detection is applied, this causes an offset error to the detection. In addition, as discussed with FIGS. 2 and 3, the proof masses of Z1, Z2 may be non-symmetrically distributed in respect to the axis Axi and therefore tilt or pivot differently. With the configuration shown in 5A, this does not compensate the effect of the deformation.

The object of the present invention is to provide a solution so as to overcome, or to alleviate at least one of the prior art disadvantages. The objects of the present invention are achieved with a MEMS sensor structure of the independent claim 1. The objects of the present invention are further achieved with an article, an accelerator sensor, an accelerator sensor matrix, a device and a system of the other independent claims. The preferred embodiments of the invention are disclosed in the dependent claims.

The term global, especially in the context of expression on globally symmetric within the embodiments of the invention, refers to the scale or dimension of the whole article that is described to have symmetrical parts. An article can be embodied globally symmetric in the embodiments of a sensor structure, sensor, and/or an ensemble of such. En ensemble may thus refer, for example, to a matrix or a stack or a stacked matrix that comprises a sensor and/or a mechanical element used in a sensor.

Thus, the "global" is not necessarily wanted to be made applicable in mere scale where the internal parts of the article have at least one symmetry in respect of/according to a symmetry element. However, it is the scale of the parts concerned themselves in the article that could be as such globally symmetric when its internal substructure is considered in the scale of said part.

As an example of an embodiment, a sensor matrix is considered to be not globally symmetric with the provision that there is a non-symmetric sensor structure in the matrix structure that makes the matrix in its scale of wholeness appear non-symmetric in the normal sense of the symmetry, although there were sensor/sensors that are locally symmetric in the scale of the sensor structure where the sensor is part of Thus, the sensor in its scale of wholeness can be globally symmetric although the sensor structure of the matrix were not.

Local, especially in the context of locally symmetric within the embodiments of the invention, in this context it means in the scale or dimension of a sub-structure at least in a part of the whole article. The article can be embodied in the embodiments of a sensor structure, sensor, and/or an ensemble of such, for example a matrix or a stack or a stacked matrix that comprises such a sensor and/or a structure used in the sensor.

Thus, the "local" is used to refer genuinely to a detail or a partial structure of the article, thus scarcely in the scale of the wholeness of the article as such, but local symmetry can be present especially also in structures of nested symmetries comprising global symmetry in the scale of individual part of such part of the structure.

Symmetry in this context is used to denote to the similarity of objects at at least two sides defined by a symmetry element. By expression symmetry element it is meant a dot, an axis, a plate, a plane and/or a sensor structure sub-object. The symmetry element is not necessarily a true object, but can be a virtual object or position, used in the defining symmetry.

Order of symmetry of an article, especially in context concerning embodiments of the invention, refers to expressions that have statement of symmetry in a particular way.

So, first order symmetry means that there is only one symmetry element for the article according to which there is a symmetry in its normal meaning in respect of a single symmetry element. Similar way, second order symmetry means that there is at least one symmetry element for the article according to which the symmetry in its normal meaning is present, but not for more than two symmetry elements defining the symmetry. Similar way, third order symmetry means that there is at least one symmetry element for the article according to which the symmetry in its normal meaning defined, but not more than three symmetry elements defining the symmetry. Similar way, fourth order symmetry means that there is at least one symmetry element for the article according to which the symmetry in its normal meaning, but there can be only symmetries that are defined by less than five symmetry elements.

According to an ensemble of embodiments, the symmetry element can have an order of symmetry. This applies also for the local and/or global symmetries for an ensemble of corresponding embodiments.

Symmetry position of an object or article is a symmetry center with which the symmetry element is about to coinside so that there is the symmetry of the symmetrical parts in respect of the symmetry element. Symmetry quality is an attribute that can be selected of the following: geometric measure, geometric feature, mass, volume, area, density, number or other quantity that is related to the symmetry in respect of a symmetry element, so that in respect of the symmetry element, applicable in an order of symmetry, there are at least two similar symmetry quality attribute expressed qualities equally amounted. In the scope of symmetry quality are also included mirror-like symmetry, but also such symmetries in which the structure comprises anti-mirror symmetry, i.e. the object is so positioned as it were mirror symmetric but has been pivoted by half a cycle or in an optional embodiment by another pivoting angle. Mirror symmetry as well as anti-mirror symmetries can be considered to have a translatory symmetry, i.e. a part that is symmetric by the symmetry element is sifted from the mirror or anti-mirror symmetry place where it were because of the mirror symmetry in respect of the symmetry element.

Plate is considered as a planar or essentially planar object, but as a physical plane, however including even a virtual plate, so representing a plane as such as a constructive term to be used for statements in which objects have common features on a plane or a plate.

In the following detailed explanation of exemplary embodiments, reference is made to the figures (via a label Fig) as indicated below:

Figure 9B:
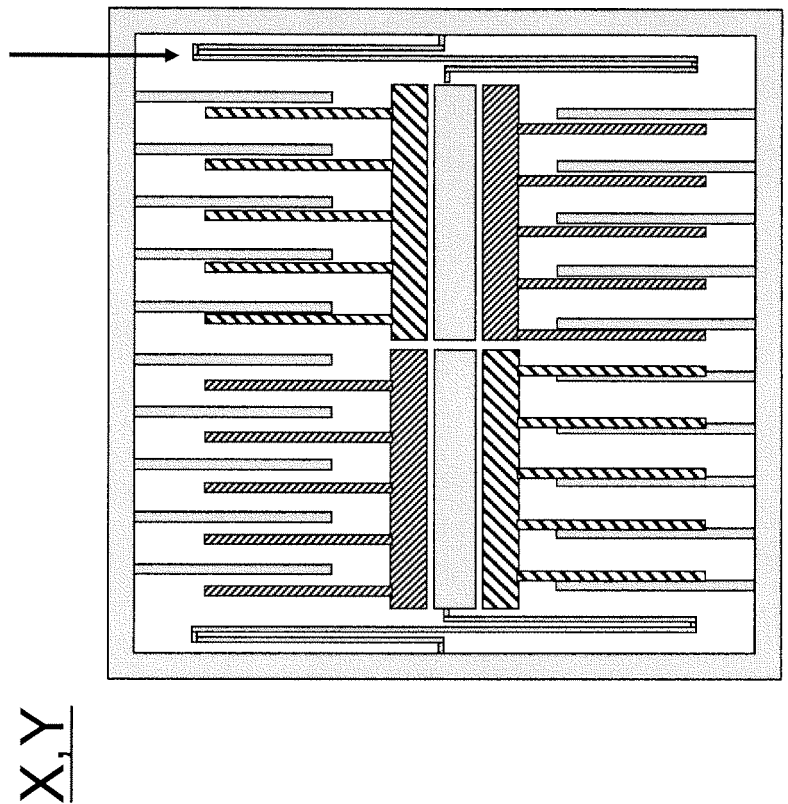
Figure 9A:
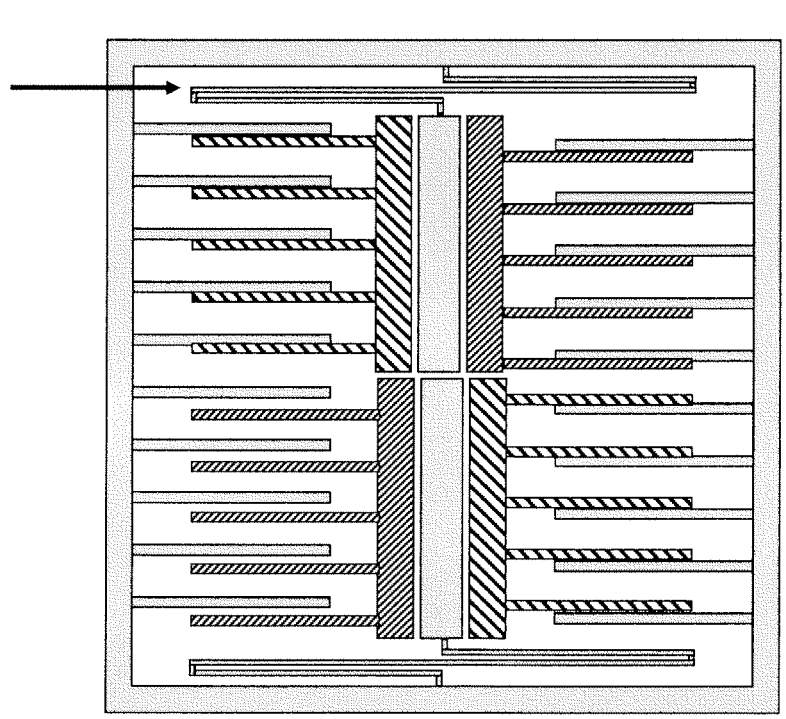
Figure 10A:
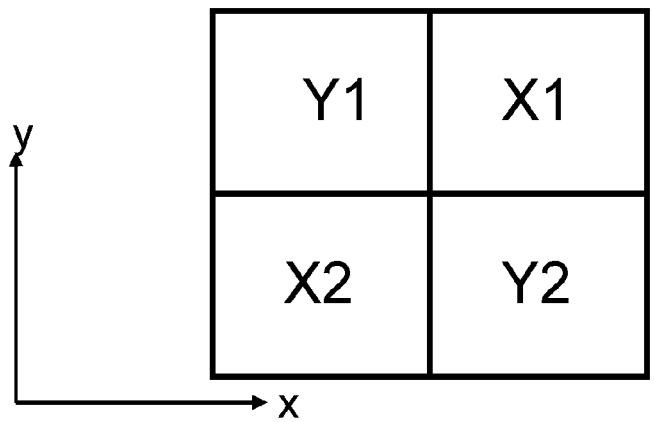
Figures 10B, 10C:
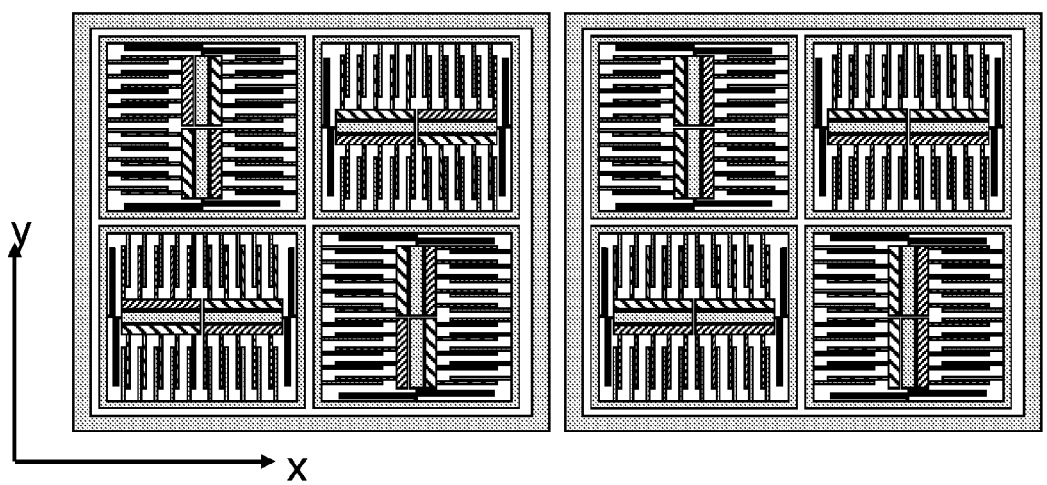
Figure 11:
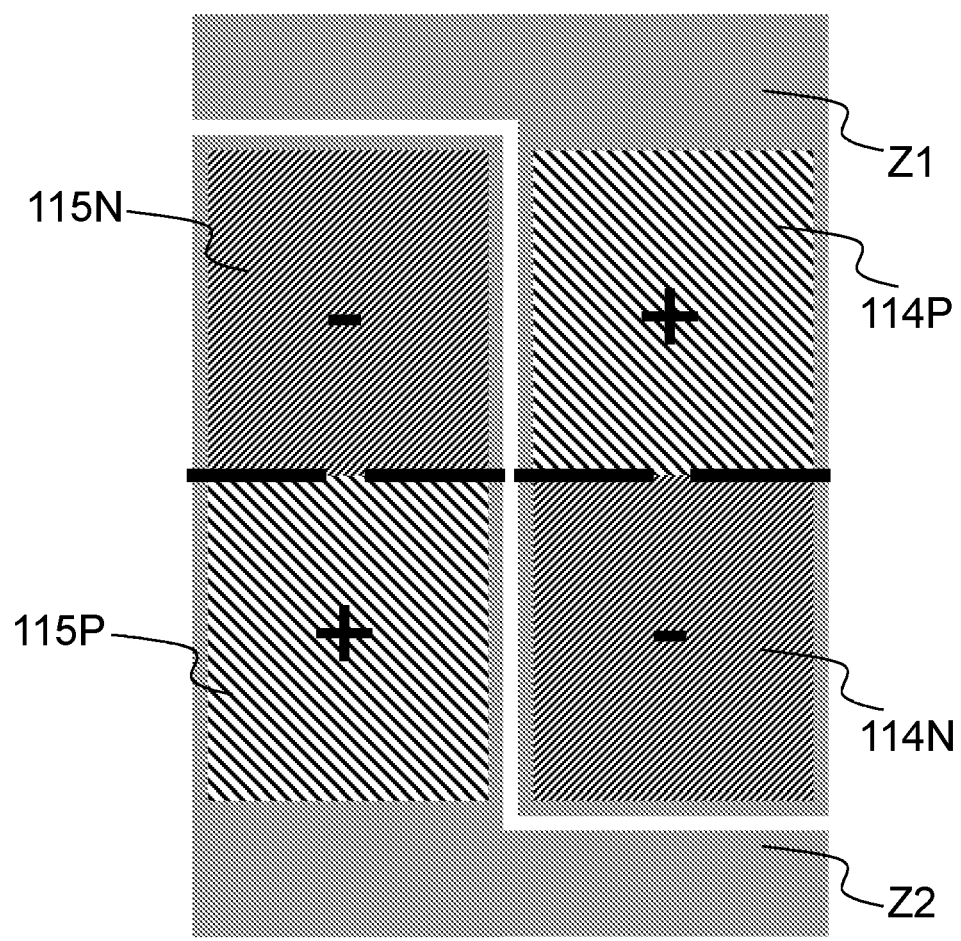
Figure 13:
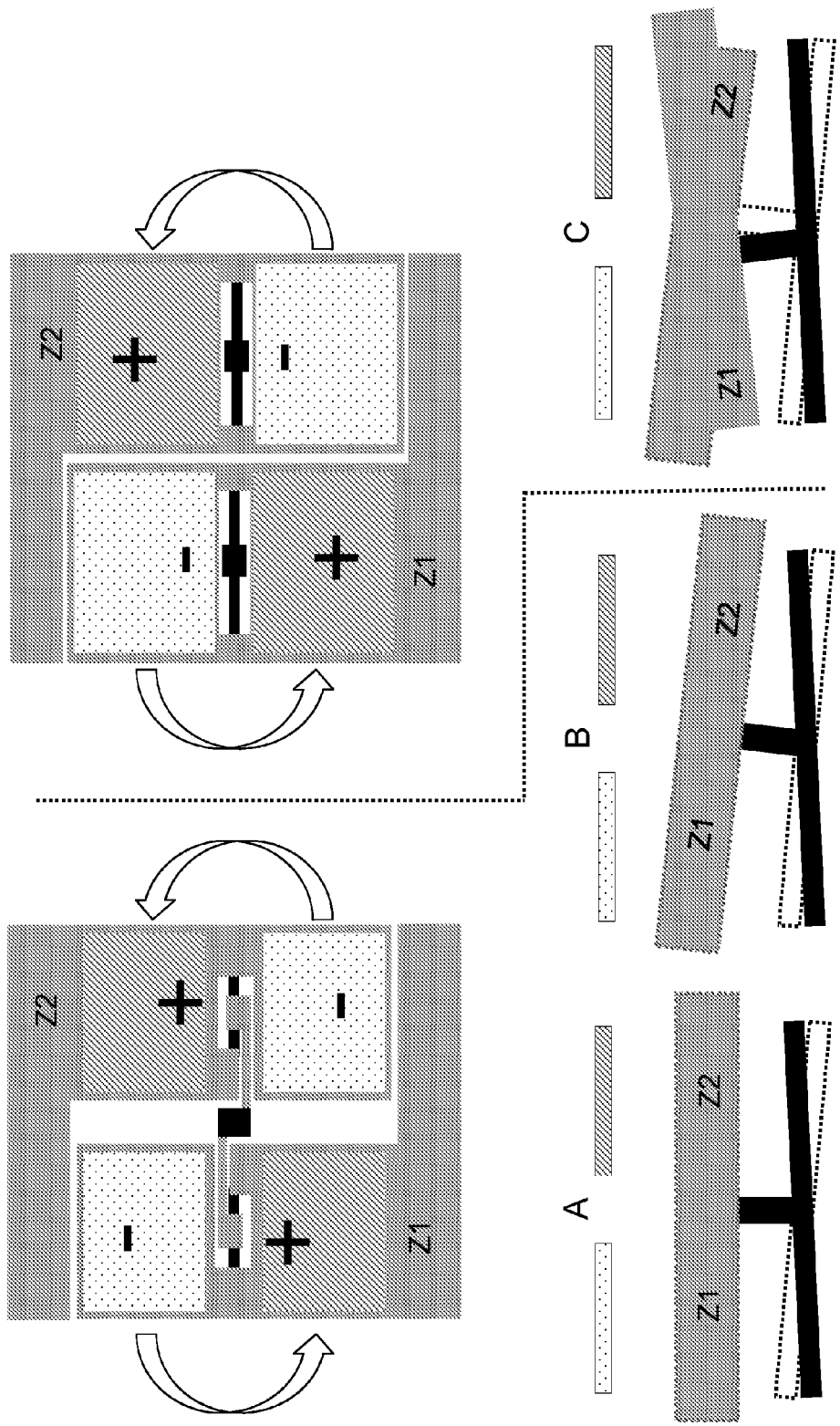
Figure 16:
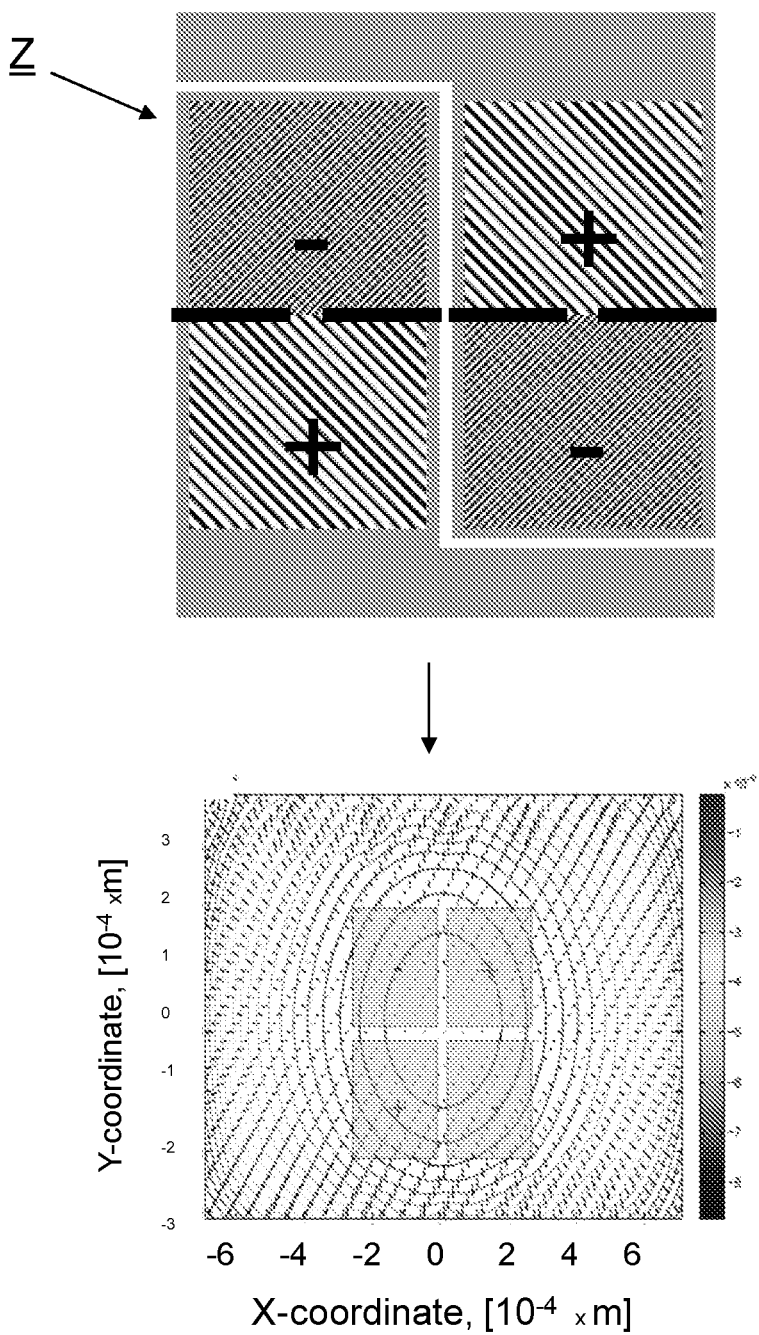
Figure 17:
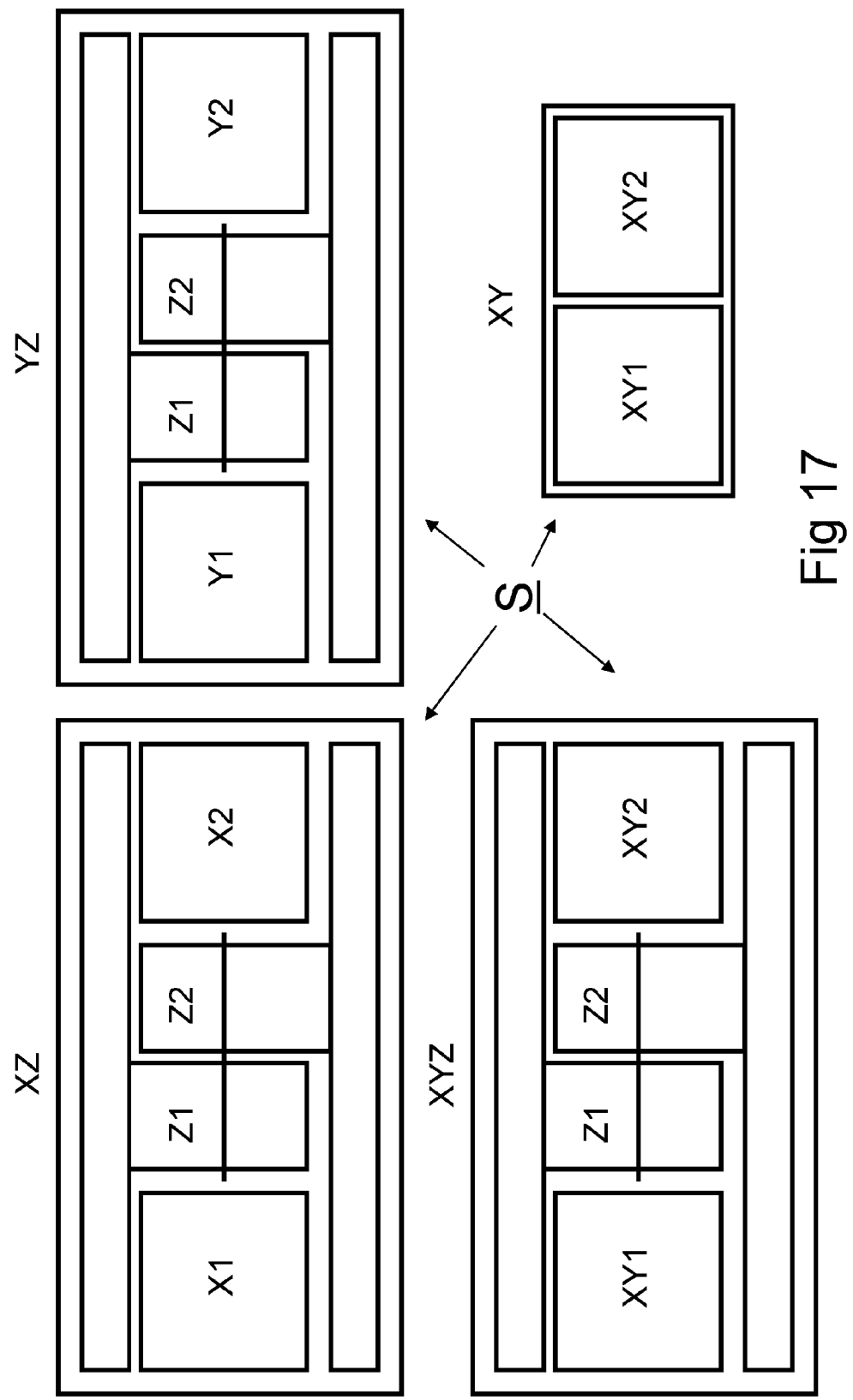
Figure 18:
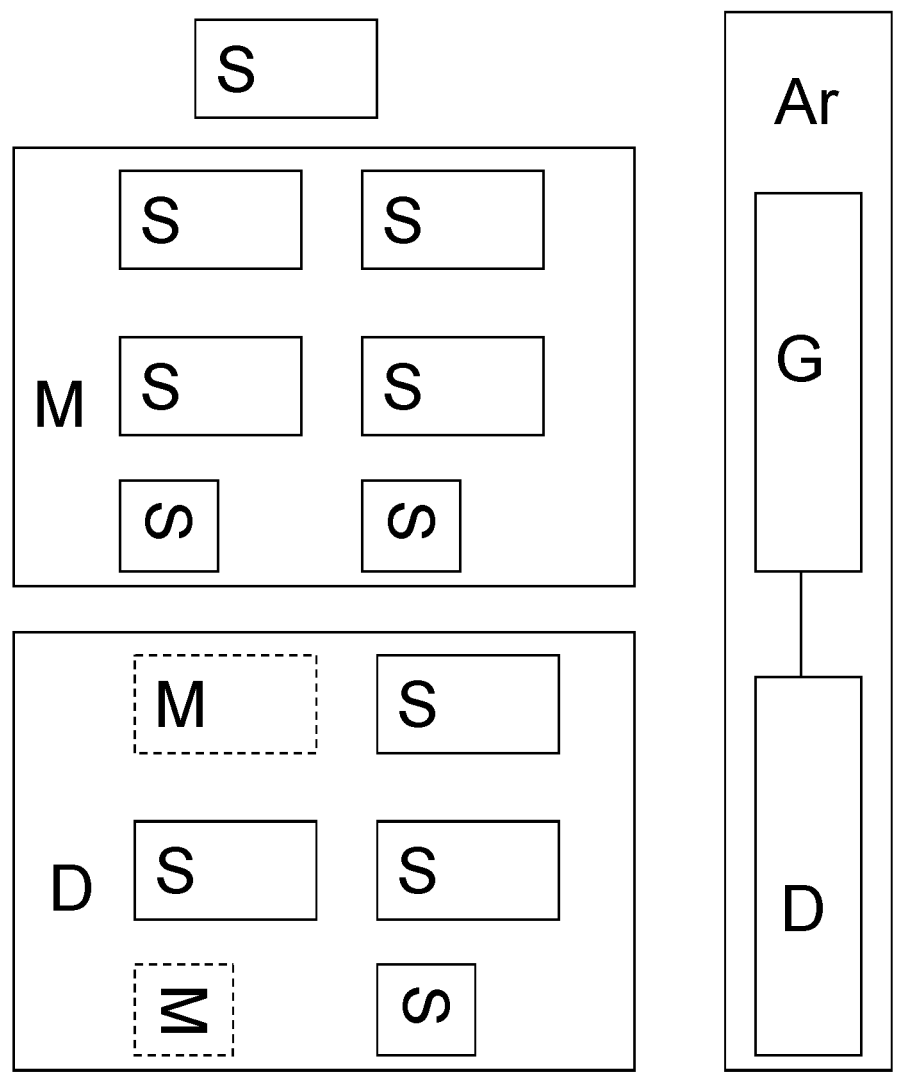

FIGS. 8A and 8B a single prior art cell and an embodiment of a sensor cell;

FIGS. 9A and 9B illustrate two embodiments with different spring suspensions for different compensating symmetries;

FIGS. 10A to 10C illustrate cell matrix configurations for detection in X- and/or Y-direction;

FIG. 11 illustrates an embodiment for Z-direction detection;

FIG. 12 illustrates an embodiment where a symmetric Z-axis direction sensor structure is suspended to an underlying substrate with a single anchor;

FIG. 13 illustrates further advantages of the embodiment of FIG. 12;

FIG. 14 illustrates another possible sensor structure configuration with a single anchoring point;

FIG. 15 illustrates a configuration of a 3d sensor structure according to an embodiment of the invention;

FIG. 16 illustrates results of simulations made with the proposed double differential structure;

FIG. 17 illustrates further possible sensor structure configurations;

FIG. 18 illustrates embodiments of acceleration sensors that use the embodied sensor structure configurations.

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

Features of the invention will be described with simple examples of sensor structures in which various embodiments of the invention may be implemented. Only elements relevant for illustrating the embodiments are described in detail. Various implementations of the invented methods and devices comprise elements that are generally known to a person skilled in the art and may not be specifically described herein.

Means of a sensor structure may comprise springs, bars, capacitor electrodes, anchors, anchor substrates, and axis, arranged into corresponding structures. Especially when concerning symmetry according to the embodiments of the invention, the means may be referred as first means, second means etc. as later shown in the figures and their description.

The term differential in the context of the embodiments means that, for example, a differential operation comprises a diminishing first quantity at a first location and an increasing second quantity at a second location coupled so that said diminishing and increasing occur because of the same operation. In differential detection both the first quantity and the second quantity are detected to generate detection results of the operation.

An example of such a structure is a capacitor pair that has two electrodes, each in a potential, and a common electrode in a ground potential. The electrodes may be arranged so that when the two electrodes pivot around an axis, the distance of these electrodes to the common ground electrode changes, one capacitance increases and the other decreases. Such construction is achieved when the mechanical coupling is made with a rigid object that is common to the two pivoting electrodes.

The term double differential in the context of the embodiments means that, for example, there is another differentially coupled pair of quantities, third quantity at a third location and an increasing fourth quantity at a fourth location that behave the same way as explained in the context of differential for the first quantity at a first location and a increasing second quantity at a second location, but with a phase sift in respect to the pair of first quantity and second quantity. In double differential detection, the first quantity, the second quantity, the third quantity and the fourth quantity are used in pairs to generate said detectable quantities from or according to the detected operation.

In some embodiments of the invention, capacitances, or derivables of them may be applied as the first and second quantities, and the third and fourth quantities. It is noted that capacitance is used as an example of pair-wise quantities, but a skilled man in the art knows that also other quantities can be arranged to depend from each other in a differential way, and also in a double differential way. In the exemplary embodiment the phase shift is 180 degrees, i.e. the pairs are in opposite phase, but the invention is not necessarily limited only to such phase shifts.

In some embodiments of the invention, pairs of quantities may be selected from the ensemble of first, second, third and fourth quantities to produce signals that depend on said quantities, and process the signals in a double differential way. According to an embodiment of the invention, the quantities may be capacitances, and the signal may be an electrical signal corresponds with the capacitances, or at least one of them. The signal may be used in determination of acceleration, or a component of acceleration with the embodied acceleration sensor structure.

Figure 6:
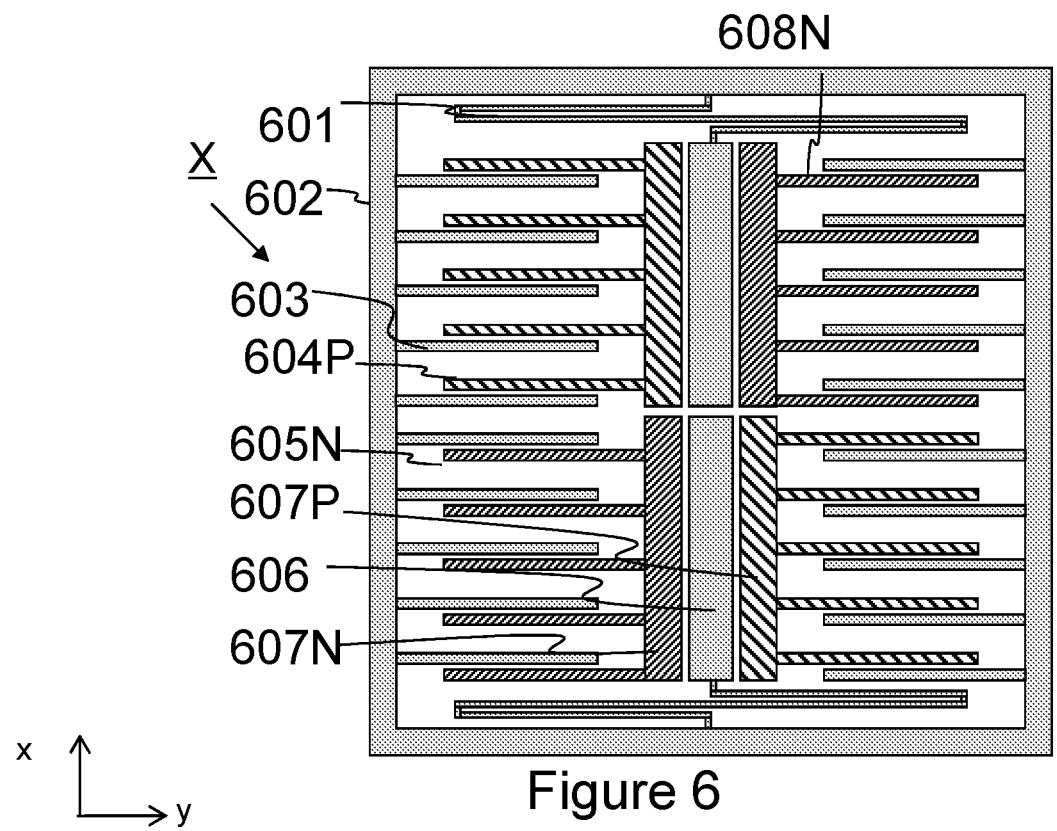
FIG. 6 illustrates a comb-structure cell with capacitive electrodes for acceleration detection in X-direction.
Figure 7:
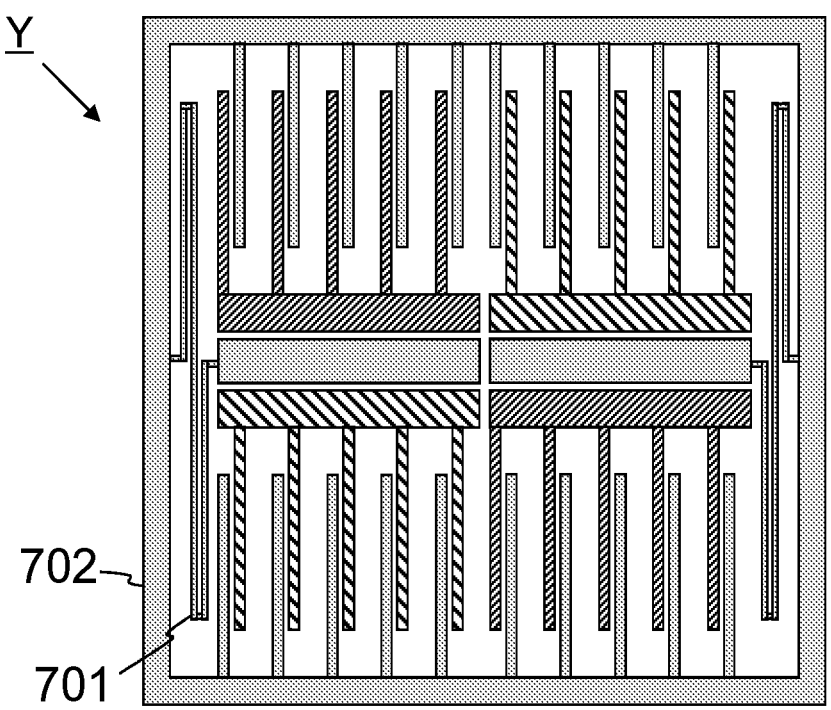
FIG. 7 illustrates a comb-structure cell with capacitive electrodes for acceleration detection in Y-direction.

FIGS. 6 and 7 illustrate exemplary sensor structures with single cells that have a comb-structure with capacitive electrodes for acceleration detection in exemplary X and Y directions, respectively. Conventional elements that provide voltages, as well as reading electronics are not shown for clarity reasons; a skilled man in the art knows ways to implement such parts of the sensor structure.

FIGS. 6 and 7 show an effective mass as a frame 602, 702 that extends around the detection combs. The detection combs comprise static electrodes 604P, 605N and moving electrodes 603. During use, elements may be biased in respect to the ground, with a positive or negative voltage. Letter P refers here to a positive charge in respect of the ground and letter N to negative charge in respect of the ground. In the figures, the type of texture of the electrodes indicates exemplary signs of the charge of the textured elements, when the cell structure is in use. In some embodiments, the bias can be electrode group specific, not necessarily the same for each acceleration component detection cell used in one direction.

Figure 1:
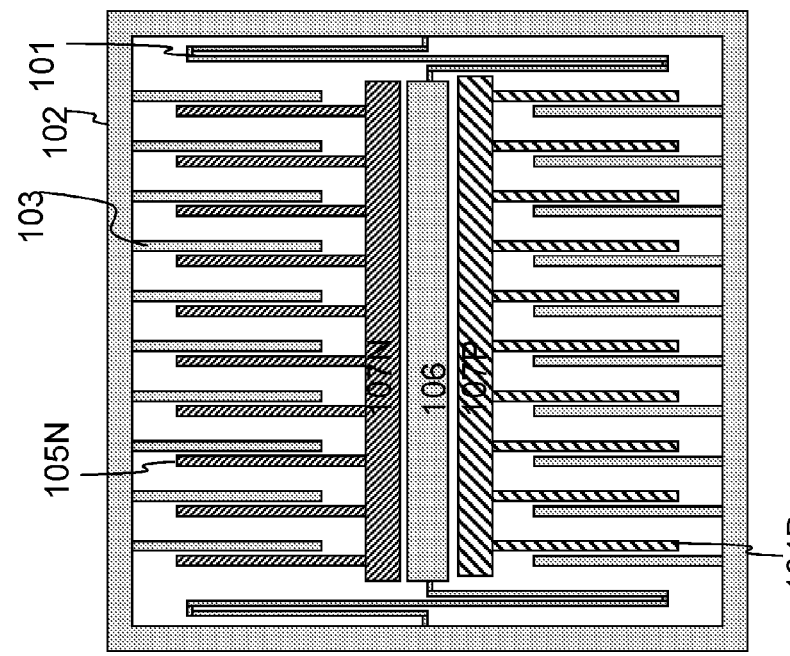
FIG. 1 illustrates a prior art x and/or y direction sensitive cell for acceleration sensing.
Figure 4A:
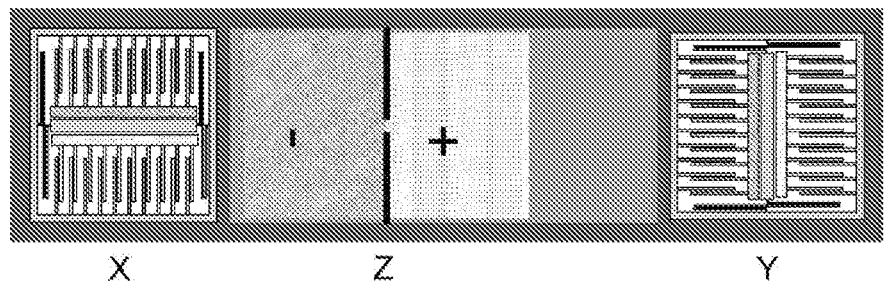
FIGS. 4A and 4B illustrate a prior art acceleration sensor structure where one mechanical see-saw element of FIG. 2 is used.
Figure 4B:
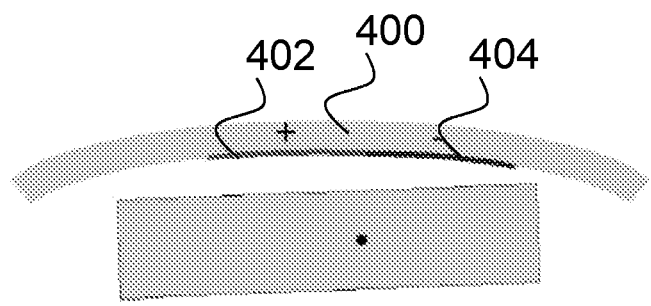
Figure 5A:
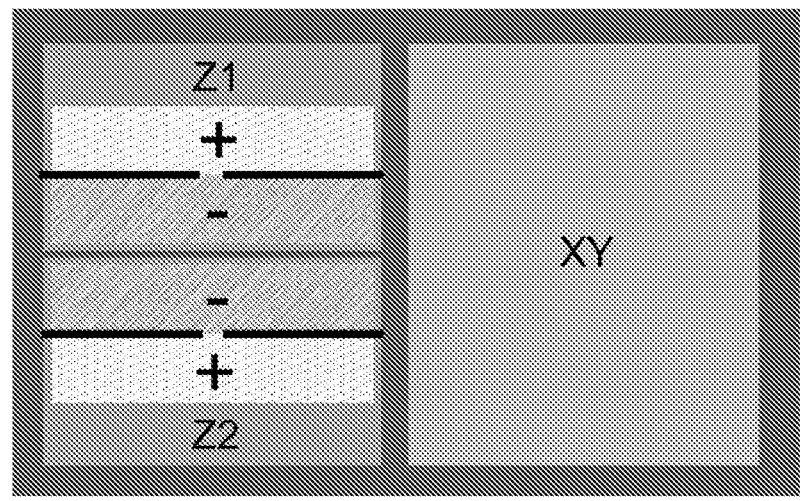
FIGS. 5A and 5B illustrate a prior art sensor structure, where a pair of mechanical see-saw elements of FIG. 3 are used.
Figure 5B:
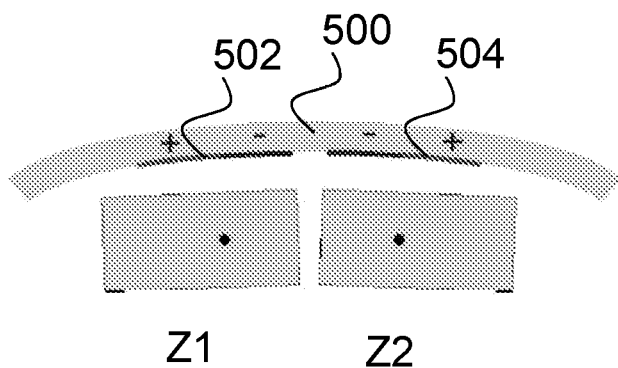

As in FIG. 1, structures that may be considered to be anchored to a surface of an object are indicated by number and character combinations 606, 607N, 607P. The cell may comprise an anchor 606 for suspending the moving frame 602, 702 with a spring 601, 701. The cell may also comprise an anchor 607N for the negative static electrodes 605N, and/or an anchor 606P for the positive electrodes 604P. Although indicated here to denote certain polarity, the anchors can be isolated in suitable part from the ground, springs and/or capacitor plates.

The elongate anchors 606 can be considered to be aligned to a symmetry axis and act as first symmetry elements in their longer first direction. The combs and/or their respective anchors 607N, 607P, and also the springs may be arranged into structural symmetry in respect of the symmetry axis. The pitch between the symmetry elements 606, having perpendicular direction to said first direction, can be considered as another, second symmetry element for the structural symmetry for the combs and/or anchors 607N, 607P, but also for the springs. It is noted that the symmetries may be considered by the charge and/or operation in the anti-mirror, mirror, rotational and/or translatory modifications from the simple mirror symmetry.

As may be seen by comparing FIG. 6 to FIG. 1, the cell structure of FIG. 6 applies double differential detection for movements of the frame 602 in X-direction. When the frame moves, the distances between the moving electrodes and the stationary electrodes change, increasing and decreasing the detectable capacitances accordingly. The first quantity of the double differential detection may thus refer here to capacitances related to the stationary negative charge electrodes 605N extending from the anchor structure 607N, and the part of the moving electrodes 603 interleaved with these stationary electrodes. The second quantity may refer to capacitances related to the stationary positive charge electrodes extending from the anchor structure 607P, and the part of the moving electrodes 603 interleaved with these stationary electrodes.

As defined earlier, differential detection result may be determined by measurements of capacitances of the first quantity and the second quantity. In order to eliminate or alleviate effects of deformations in the sensor structure, the cell structure of FIG. 6 is arranged to provide double differential detection with a compensating symmetry between the two differential detection elements. A first pair of elements provides the first quantity and second quantity for a first differential detection of a movement, and a second pair that provides the third quantity and the fourth quantity for the double differential detection of the same movement. For the compensating symmetry, the first pair is arranged to operate in an opposite phase to the second pair. In FIG. 6, the third quantity may thus refer to capacitances related to the stationary negative charge electrodes 608N, and the part of the moving electrodes 603 interleaved with these stationary electrodes. The fourth quantity may refer to capacitances related to the stationary positive charge electrodes 604P, and the part of the moving electrodes 603 interleaved with these stationary electrodes.

The opposite phase means in this context that the first and the second pair are positioned such that one detected movement of the frame effects simultaneously to a diminishing quantity in one pair and to an increasing quantity in the other pair. This means that if the diminishing of the first quantity at the first location and the coupled increasing of the second quantity at the second location is disturbed by displacement of components, due to the symmetric positioning of the third and fourth quantities of the second pair, a reverse displacement is caused to the second pair, and the effect of the displacement is at least partly eliminated.

FIG. 6 illustrates en exemplary implementation of double differential detection where the sensor structure is oriented for detection in X-direction and FIG. 7 illustrates en exemplary implementation of double differential detection where the sensor structure is oriented for detection in Y-direction.

The cells in FIGS. 6 and 7 are suitable for detection of acceleration components in the X and/or Y-direction. Thus, each of these mono-axial cells can be used to one directional acceleration component, X or Y, by arranging the cell to an appropriate position to detect the respective acceleration component. In some embodiments, these cells may also be used in pairs to detect acceleration components in an XY-plane. The structure of an X-direction cell may be the same as for a Y-direction cell, but the X-direction cell may be pivoted 90 degrees in respect of the Y-direction cell in a plane. However, cells of FIGS. 6 and 7 can also be used to form a cell matrix. When the matrix includes only one type cells, X- or Y-direction cells, the matrix is capable to detect one kind of acceleration components. The matrix may also be arranged to be capable of detecting X- and Y-direction components of acceleration in a plane by including in the matrix both types of cells in respective orientations. For mono-axial detection, all the cells may be the same X or Y-direction type cells, but for bi-axial detection at least one of the cells should be of another type than the rest of the cells.

The Cartesian XYZ-notation is used for illustrative purposes only. The detection directions may differ from the indicated examples along with the sensor's position and kinetic state, including the rotation state and translatory states.

FIGS. 8A and 8B illustrate advantages of the invention by comparing a single prior art cell of FIG. 8A to an embodiment of a sensor cell of FIG. 8B. In a direction indicated with a horizontal arrow A, both cells of 8A and 8B provide signals or signal components in a similar way. Let us assume that, for example due to a deformation of the supporting substrate, the detection frame is displaced as shown in the figures, i.e. the electrodes below the symmetry axis tend to interleave more than the electrodes above the axis. Such displacement decreases the capacitance of the upper electrodes, while the capacitance of the lower electrodes increases. In the example of FIGS. 8A and 8B, N is used to denote locally the negative capacitor electrodes below the symmetry axis S, P the positive capacitor electrodes below the symmetry axis S, n the negative capacitor electrodes above the symmetry axis S, and p the positive capacitor electrodes above the symmetry axis S.

In FIG. 8A, the sensor structure comprises electrodes P and n, and the output signal corresponds differentially with the changes of the capacitances created with electrodes P and n. In FIG. 8B, the structure comprises electrodes P, N, p and n, and the output signal corresponds double differentially with the changes of the capacitances created with electrodes P, N, p and n.

It is easily seen that the depicted misalignment of the structure in FIG. 8A generates an offset error signal:

$$\text{err}(N)-\text{err}(p)>0, \quad (1)$$

In the configuration of FIG. 8B, however, the error vanishes:

$$[\text{err}(N)+\text{err}(n)]-[\text{err}(P)+\text{err}(p)]=0. \quad (2)$$

This results from the double differential detection in combination with the compensating structure symmetry. The first pair of electrodes (N,p) and the second pair of electrodes (P,n) are positioned such that the detected movement of the frame has a similar effect to N of the first pair and to P of the second pair, as well as to p of the first pair and to n of the second pair. Even if the generated single capacitances may be disturbed by unwanted displacement of the frame and the electrodes, due to the symmetric positioning, a similar but reverse disturbance is caused to both of the pairs. Since double differential detection is used, the potential offset error is thus effectively compensated.

FIGS. 9A and 9B illustrate two embodiments of sensor structures with different spring suspensions for different compensating symmetries. The mirror-wise assembled springs of FIG. 9B are less sensitive to cross-axis errors as the non-mirror-wise oriented embodiment of 9A. However, the embodiments of FIG. 9A may be used in applications where such sensitivity is less important. In an optional embodiment of the invention, importance of cross-axis error may be estimated by including both type spring symmetries in a matrix of X and/or Y cells.

In embodiments of the invention, the middle anchors may be separate from each other or the middle anchors may be mechanically connected to each other.

As discussed above, single cells can be combined to provide a cell matrix. FIG. 10A illustrates a sensor structure matrix configuration, including cells X1, X2 for detection in X-direction (later: X-cell), and cells Y1, Y2 for detection in Y-direction (later: Y-cell). FIGS. 10B and 10C illustrate two exemplary configurations of sensor structure matrices for detection in X- and Y-direction (later: XY-cell). An XY-cell can have a double differential structure with the compensating double symmetry. In the cell matrix of FIG. 10B, each of the individual cells is implemented with the compensating symmetry. In the cell matrix of FIG. 10C, the individual cells are implemented without the compensating symmetry, but the cells are arranged in the cell matrix into positions such that a desired compensating symmetry is achieved.

Figure 2:
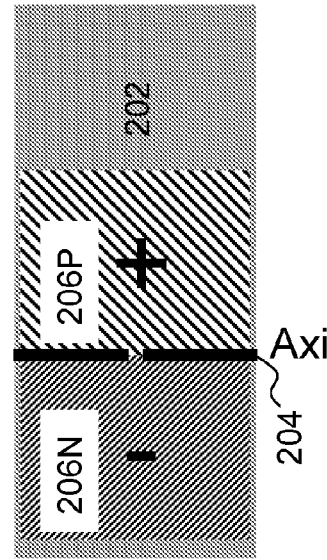
FIG. 2 illustrates a prior art mechanical element for an acceleration sensing cell.
Figure 3:
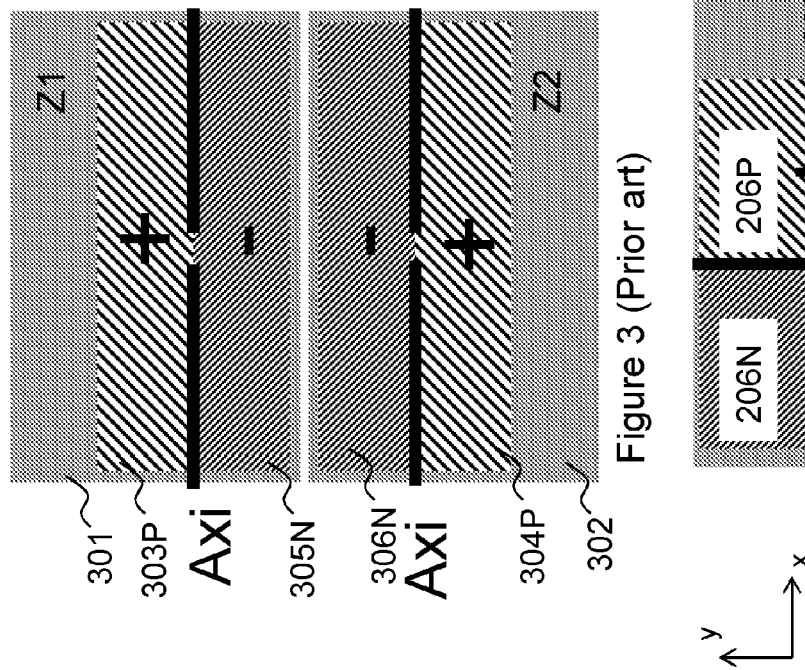
FIG. 3 illustrates another prior art mechanical element for an acceleration sensing cell.

FIG. 11 illustrates an embodiment of a sensor structure where double detection and compensating symmetry are applied in detection of accelerations in the Z-direction. According to an embodiment of the invention each of the elements Z1 and Z2 may be implemented as a differential see-saw structure, as discussed with FIGS. 2 and 3. According to an embodiment of the invention they (Z1, Z2) may be positioned mutually to implement the error compensating double differential structure. As discussed earlier, in Z-direction acceleration detection, mechanical see-saw proof masses may be provided with electrode areas. The electrode areas may be arranged to interact with stationary electrodes to provide capacitances that change according to the distance between the electrode areas and the stationary electrodes. In the exemplary FIG. 11, double differential detection is implemented by combining capacitances of a positively charged electrode 114P and negatively charged electrode 114N of Z1 and a positively charged electrode 115P and negatively charged electrode 115N of Z2. The acceleration output may be arranged to correspond to capacitances:

$$A_{out}\sim[C(114P)+C(115P)]-[C(114N)+C(115N)]$$

As shown in FIG. 11, mass distributions of Z1 and Z2 are advantageously arranged such that Z1 and Z2 operate in opposite phase. Acceleration of the structure in Z-direction thus causes Z1 to tilt in one direction and Z2 in another direction. If a ground electrode extends over the electrodes, a deformation of the substrate supporting the ground electrodes may displace the configuration such that distance of electrode 114N to the ground electrode increases at the same time as the distance of the electrode 114P to the ground electrode decreases. The displacement thus inherently decreases values measured for capacitance of 114N and increases values measured for capacitance of 114P. The deformation tilts the elements in a similar manner so that the same is valid for distances and capacitances of 115P and 115N, i.e. the displacement simultaneously decreases values measured for capacitance of 115P and increases values measured for capacitance of 115N. It is now seen that in the acceleration output, these errors arising from the displacements in the configuration are mutually cancelled by the point symmetric positioning of the electrodes.

There can be a common ground electrode for both capacitor electrodes indicated in FIG. 11 with + and − signs. In another embodiment, the electrodes for ground potential can be separate, and even biased.

FIG. 12 illustrates a further embodiment of a sensor structure, where a symmetric Z-axis direction sensor structure is suspended to an underlying substrate with a single anchor 120. The anchoring may extend with an essentially rigid support structure 121 to the rotational springs 122. The elements Z1, Z2 are connected to the rotational springs and may pivot or rotate around the axis of the springs as disclosed in FIG. 11. In order to achieve the double differential detection and the compensating symmetry, the elements Z1 and Z2 are point symmetrical in respect of the anchoring point of the anchor 120. This single point anchoring makes the anchoring even more insensitive to deformations of the support substrate. This further advantage is illustrated in more detail with FIG. 13.

FIG. 13 illustrates three different situations A, B and C where a substrate that supports the sensor structure is twisted, for example due to thermal stresses. In cases A and B the double differential sensor structure of previous embodiments is connected to the substrate via one anchor, as disclosed in FIG. 12. Case A illustrates a situation where the anchor point is positioned to a global symmetry point of the substrate. When the substrate is twisted, i.e. end of the substrate are rotated in in different directions, the global symmetry point does not displace, and no offset error is generated by the twist. Case B illustrates a situation where the anchor point position is off the global symmetry point of the substrate. When the substrate is twisted, the structure comprising elements Z1 and Z2 tilts and an offset error is created. As disclosed above, however, this error is eliminated by the compensating symmetry of the double differential detection. Case C illustrates a situation where both elements Z1, Z2 are separately anchored to the substrate.

When the substrate is twisted, the structure moves differently under anchor of Z1 and under anchor of Z2.

FIG. 14 illustrates another possible sensor structure configuration of elements Z1 and Z2 with a single anchoring point 140.

FIG. 15 illustrates a configuration for a 3d sensor structure according to an embodiment of the invention. The sensor structure may comprise X- and Y-cells according to some earlier embodiment of the present invention, and a Z-cell arranged to a position between them. As disclosed in FIG. 14, dimensions of Z1 and Z2 may be continued in the X-Y-plane of the sensor structure to extend beyond the Y-dimensions of the X- and Y-cells, advantageously all the way to the outer ends of the X- and Y-cells in the X-direction. The increase of the masses of the opposing elements Z1 and Z2 results in higher sensitivity in the Z-direction. This higher sensitivity may be obtained with the shown configuration in a compact manner and minimal use of space.

FIG. 16 illustrates results of simulations made with the compensating double differential structure. The simulation output shown in the lower part of FIG. 16 indicates that torques and their deforming effects in the sensor element can be eliminated as the X and Y-coordinate figure indicates.

FIG. 17 illustrates further embodiments of sensor structure matrices using the notions discussed earlier in the application text. The letter S symbolizes examples of use of a sensor structure that comprises double differential cells and/or see-saws indicated by XY and/or Z letters, to exemplify the Cartesian coordinate system for 3d-acceleration component detection.

FIG. 18 illustrates embodiments of acceleration sensors that use the embodied sensor structure S. Letter S denotes a sensor or a sensor structure. Letter M denotes to a matrix that comprises a sensor or the sensor structure embodied above. Although four sensors of one type are indicated in one position, and two sensors of a different type in another position, as an example, the number of sensors or their types (X, Y, Z or a combination thereof) are not limited only to the indicated example. Letter D denotes a device that comprises a sensor or a sensor structure matrix as embodied above. Although four sensors of one type are, three in one position and one sensor of a different type in another position, as an example, the number of sensors or their type is not limited only to the indicated example. The number and/or positions of the sensor matrixes in the device are not limited to the shown examples only. The letter combination Ar demonstrates an arrangement or a system that comprises (Devices D and G) at least one embodied sensor structure in the device D, and/or a device G according to an embodiment of the invention. The position of the letters S and M in some embodiments illustrates to a skilled man in the art that sensor structures in various embodiments can be operated independently on the position of the mastering device, whose acceleration is monitored with the sensor structure.

The invention claimed is:

1. A sensor structure matrix, comprising four sensor cells with a planar structure, wherein
    each sensor cell includes capacitive detection combs and a frame that extends around the detection combs in a common plane, moving electrodes of the detection combs being coupled to move with the frame;
    said sensor cells are arranged into the common plane to detect acceleration components in the common plane,
    a pair of sensor cells is arranged for detection in a first in-plane direction;
    another pair of sensor cells is arranged for detection in a second in-plane direction, wherein the second in-plane direction is perpendicular to the first direction; and
    the pairs of sensor cells are positioned to provide compensating symmetry in the common plane of the sensor structure matrix.

2. A sensor structure matrix of claim 1, wherein also each of the sensor cells is implemented with internal compensating symmetry.

3. A sensor structure matrix of claim 1, wherein the sensor cells are implemented without internal compensating symmetry.

4. A sensor structure matrix of claim 1, wherein said sensor cells are arranged into a two-by-two matrix, in which sensor cells of each pair of sensor cells occupy crosswise positions.

5. A sensor cell for mono-axial detection, including:
    at least four capacitive detection combs in a common plane, the detection combs including static electrodes and moving electrodes;
    a frame that extends around the detection combs in the common plane;
    an anchor structure;
    a spring that suspends the frame from the anchor structure and enables linear motion of the frame in the common plane; wherein
    the moving electrodes of the at least four detection combs are coupled to move with the frame;
    the four detection combs are disposed into structural symmetry in respect of a first symmetry axis that is parallel to the linear motion of the frame and in respect of a second symmetry axis that is perpendicular to the first symmetry axis;
    the four detection combs are arranged in pairs into internal compensating symmetry in which detection combs of each pair occupy crosswise positions in respect of the first symmetry axis and the second symmetry axis, and in which displacement of the frame in one direction increases capacitance in a first pair of detection combs, and decreases capacitance in a second pair of detection combs;
    output signal of the sensor cell corresponds double differentially with capacitances created with the first pair of detection combs and the second pair of detection combs.

6. A sensor cell of claim 5, wherein the first pair of detection combs is biased with a positive voltage and the second pair of detection combs is biased with a negative voltage.

7. A sensor cell of claim 5, wherein a double differential output signal of the sensor cell is a sum of capacitances of the first pair of detection combs subtracted from a sum of the second pair of detection combs.

* * * * *